(12) United States Patent
Nien et al.

(10) Patent No.: US 12,006,765 B2
(45) Date of Patent: Jun. 11, 2024

(54) WINDOW COVERING

(71) Applicant: Nien Made Enterprise Co., Ltd., Taichung (TW)

(72) Inventors: Chao-Hung Nien, Taichung (TW); Jui-Pin Jao, Miaoli County (TW); Chin-Chu Chiu, Hsinchu County (TW); Ping-Yu Chu, Hsinchu County (TW)

(73) Assignee: Nien Made Enterprise Co., Ltd., Taichung (TW)

( * ) Notice: Subject to any disclaimer, the term of this patent is extended or adjusted under 35 U.S.C. 154(b) by 842 days.

(21) Appl. No.: 17/125,961

(22) Filed: Dec. 17, 2020

(65) Prior Publication Data

US 2021/0189798 A1 Jun. 24, 2021

(30) Foreign Application Priority Data

Dec. 20, 2019 (TW) ................................ 108217046

(51) Int. Cl.
| | |
|---|---|
| *E06B 9/38* | (2006.01) |
| *E06B 9/262* | (2006.01) |
| *H02K 11/21* | (2016.01) |
| *H02K 11/33* | (2016.01) |

(52) U.S. Cl.
CPC ................ *E06B 9/38* (2013.01); *H02K 11/21* (2016.01); *H02K 11/33* (2016.01); *E06B 9/262* (2013.01); *E06B 2009/2625* (2013.01); *H02K 2207/03* (2013.01)

(58) Field of Classification Search
CPC ............. E06B 9/322; E06B 2009/3222; E06B 2009/3225; E06B 9/262; E06B 9/38; H02P 6/06; H02P 6/08; H02K 11/21
See application file for complete search history.

(56) References Cited

U.S. PATENT DOCUMENTS

| | | | |
|---|---|---|---|
| 6,283,190 B1 | 9/2001 | Hu | |
| 6,369,530 B2 * | 4/2002 | Kovach | ..................... E06B 9/32 |
| | | | 388/933 |
| 7,063,122 B2 | 6/2006 | Colson | |
| 8,193,742 B2 | 6/2012 | Skinner | |

(Continued)

FOREIGN PATENT DOCUMENTS

| | | |
|---|---|---|
| EP | 3 489 452 A1 | 5/2019 |
| WO | 2021/123176 A1 | 6/2021 |

*Primary Examiner* — Abe Massad
*Assistant Examiner* — John W Hanes, Jr.
(74) *Attorney, Agent, or Firm* — Winston Hsu

(57) ABSTRACT

A window covering includes a headrail, a covering material located below the headrail, a rotating member connected to the covering material and provided in the headrail, a motor provided in the headrail and coupled to the rotating member, and a control device provided in the headrail and electrically connected to the motor. The headrail has a longitudinal direction. The rotating member is adapted to drive the covering material to expand or collapse. The motor drives the rotating member to rotate. When a moving speed of a lower end of the covering material decreases and such a situation lasts for a predetermined time, the control device controls the motor to stop operating. Whereby, no matter whether the covering material is fully expanded, fully collapsed, or encounters resistance somewhere in between, the motor can be stopped.

18 Claims, 13 Drawing Sheets

(56) References Cited

U.S. PATENT DOCUMENTS

| | | |
|---|---|---|
| 8,540,005 B2 | 9/2013 | Baugh |
| 8,830,058 B2 | 9/2014 | Yeh |
| 9,334,688 B2* | 5/2016 | Colson ............... E06B 9/42 |
| 9,335,753 B2 | 5/2016 | Baugh |
| 9,399,888 B2* | 7/2016 | Colson ............... E06B 9/68 |
| 9,869,124 B2* | 1/2018 | Hall ................ E06B 9/308 |
| 10,655,384 B2 | 5/2020 | Foley |
| 11,035,172 B2 | 6/2021 | Rieper |
| 11,377,905 B2 | 7/2022 | Colson |
| 11,448,009 B2 | 9/2022 | Otsuka |
| 11,486,193 B2 | 11/2022 | Chiang Huang |
| 2007/0089838 A1 | 4/2007 | Wetsema |
| 2010/0206492 A1 | 8/2010 | Shevick |
| 2012/0200247 A1 | 8/2012 | Baugh |
| 2012/0261079 A1 | 10/2012 | Chambers |
| 2013/0087296 A1 | 4/2013 | Mullet |
| 2016/0017656 A1* | 1/2016 | Adreon ............... E06B 9/42 |
| | | 160/7 |
| 2017/0096853 A1 | 4/2017 | Eubanks, Sr. |
| 2018/0080279 A1 | 3/2018 | Eubanks, Sr. |
| 2018/0116040 A1* | 4/2018 | Mann ............... G08C 17/02 |
| 2018/0174781 A1* | 6/2018 | Fangmann ............ E06B 9/72 |
| 2021/0238920 A1 | 8/2021 | Zhang |
| 2022/0085738 A1 | 3/2022 | Nien |
| 2023/0009409 A1 | 1/2023 | Lagarde |
| 2023/0019542 A1 | 1/2023 | Dupielet |
| 2023/0193688 A1 | 6/2023 | Strand |

* cited by examiner

WINDOW COVERING

BACKGROUND OF THE DISCLOSURE

1. Field of the Disclosure

The present disclosure relates generally to a window covering, and more particularly to a window covering which uses a motor to extend and retract (i.e., to raise and lower) the covering material thereof.

2. Description of the Prior Art

When installed to cover building openings, window coverings can provide specific effects, such as keeping privacy, insulating heat, and blocking light. Typically, a conventional window covering includes a headrail and a covering material; in the headrail, there are usually a spindle, a decelerator, a motor, and a control device. The covering material is located below the headrail, and can be driven through a cord which is connected to the spindle. The decelerator is connected between the spindle and a shaft of the motor. The control device can be used to control the motor, whereby the shaft is able to, through the decelerator and the spindle, drive the covering material to be extended or retracted.

If the covering material is hindered or even pulled downward by someone or some objects during its collapsing or ascending and therefore is unable to rise smoothly, such a situation may cause damage to the blocking objects. In addition to this, the force that holds the covering material back will be also transferred to the motor through the spindle, becoming a force exerted on the motor in a direction opposite to its rotating direction. The covering material, the power transmitting mechanism, or even the motor itself may get damaged as a result. On the other hand, while the covering material is expanding (i.e., closing), the motor will not stop operating until receiving a stop command, and therefore the covering material will keep descending even if it bumps into any blocking object. A continuously lowering covering material is capable of damaging the blocking object, or, since the bottom of the covering material is obstructed by the blocking object, the covering material is likely to expand or lower unevenly with unbalanced tension, and the rest of the cord which is still wound around the spindle may become misarranged or loose, affecting the smoothness of the operations that take place next time.

In addition, the upper and lower limits corresponding to the complete retracted and extended states of the covering material have to be set up before the window covering is ready to use so that the motor can automatically stop operating when the window covering is fully opened or closed. The conventional way to do the set-up is to manually stop the motor through a control device when the covering material is fully raised or lowered. A position detector connected to the shaft of the motor is then used to detect and collect the location information corresponding to the current states of the window covering, and the location information will be saved in the control device. Once the position detector is rotated to a recorded position as being concurrently driven by the shaft of the motor, the control device sends out a command to make the motor stop operating. However, this manual way to set up the upper and lower limits requires additional preparation in advance, and the information deviation of the position detector can accumulate after a period of use, leading to imprecise upper and lower limits that have to be recalibrated, which unnecessarily increases the inconvenience of using a window covering.

SUMMARY OF THE DISCLOSURE

The present disclosure provides a window covering which includes a headrail, a covering material, a rotating member, a driving device, and a control device. The headrail has a longitudinal direction. The covering material is provided below the headrail. The rotating member is provided in the headrail and connected to the covering material, wherein the rotating member is adapted to drive the covering material to be extended or retracted. The driving device is provided in the headrail and coupled to the rotating member, wherein the driving device drives the rotating member to rotate. The control device is provided in the headrail and electrically connected to the driving device. When a moving speed of a lower end of the covering material decreases and such a situation lasts for a predetermined time, the control device controls the driving device to stop operating.

With the above design, the control device could control the driving device to stop operating when the moving speed of the lower end of the covering material decreases and the situation lasts for a predetermined time. In this way, no matter whether the covering material is fully expanded to a fully expanded (i.e., fully lowered) position, is fully collapsed to a fully collapsed (i.e., fully raised) position, or encounters resistance during its movement, the driving device could be controlled to stop operating, whereby the covering material could be stopped from continuously moving. As a result, the components and procedures required for setting up the upper and lower limits could be reduced or even omitted. Furthermore, in any circumstances that a window covering bumps into a blocking object, the window covering could be prevented from further colliding with the blocking object, and therefore the blocking object and the window covering would not be damaged.

These and other objectives of the present disclosure will no doubt become obvious to those of ordinary skill in the art after reading the following detailed description of the preferred embodiment that is illustrated in the various figures and drawings.

BRIEF DESCRIPTION OF THE DRAWINGS

The present disclosure will be best understood by referring to the following detailed description of some illustrative embodiments in conjunction with the accompanying drawings, in which.

DETAILED DESCRIPTION

Figure 1:
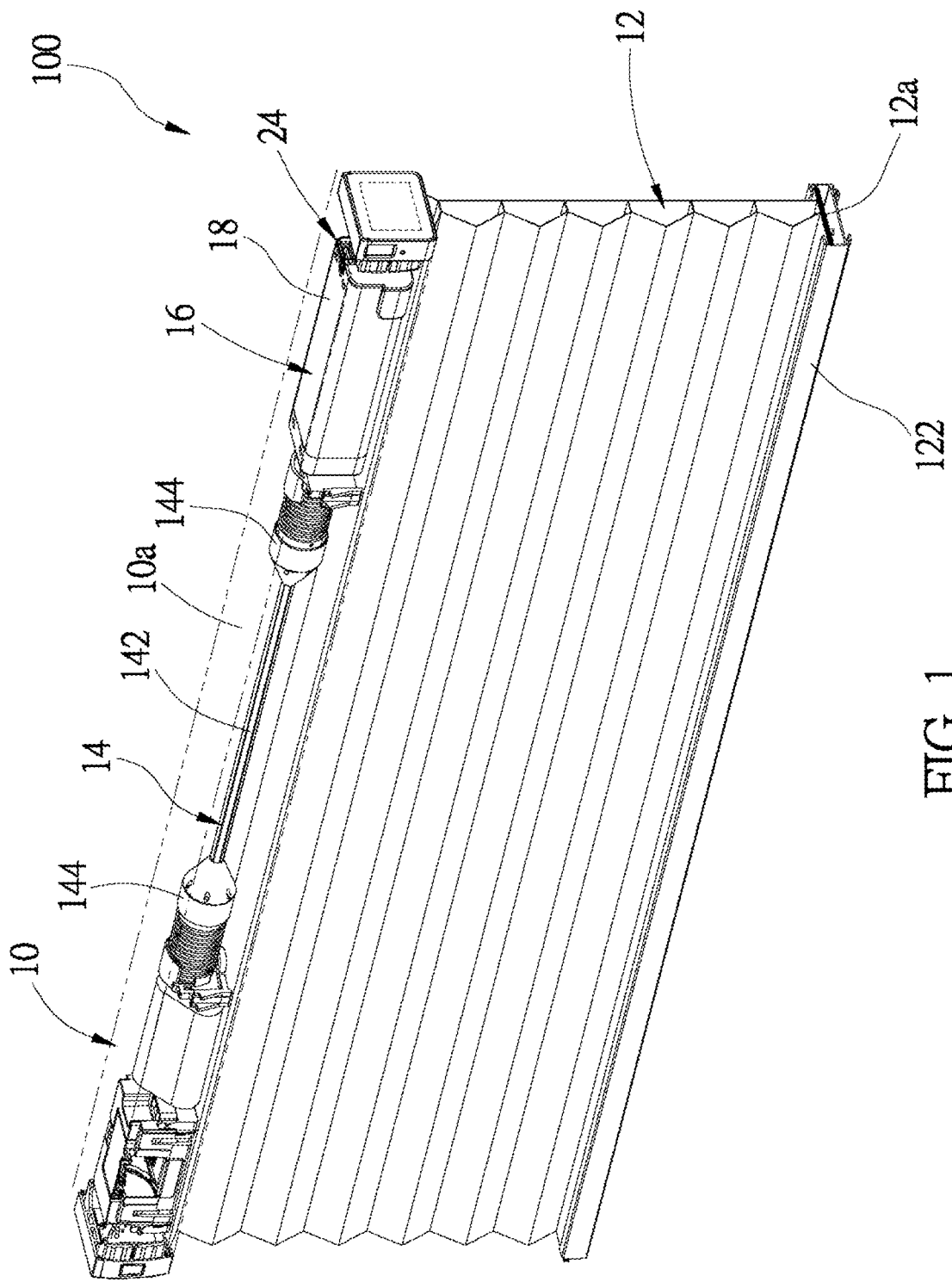
FIG. 1 is a perspective view of the window covering of a first embodiment of the present disclosure.
Figure 2:
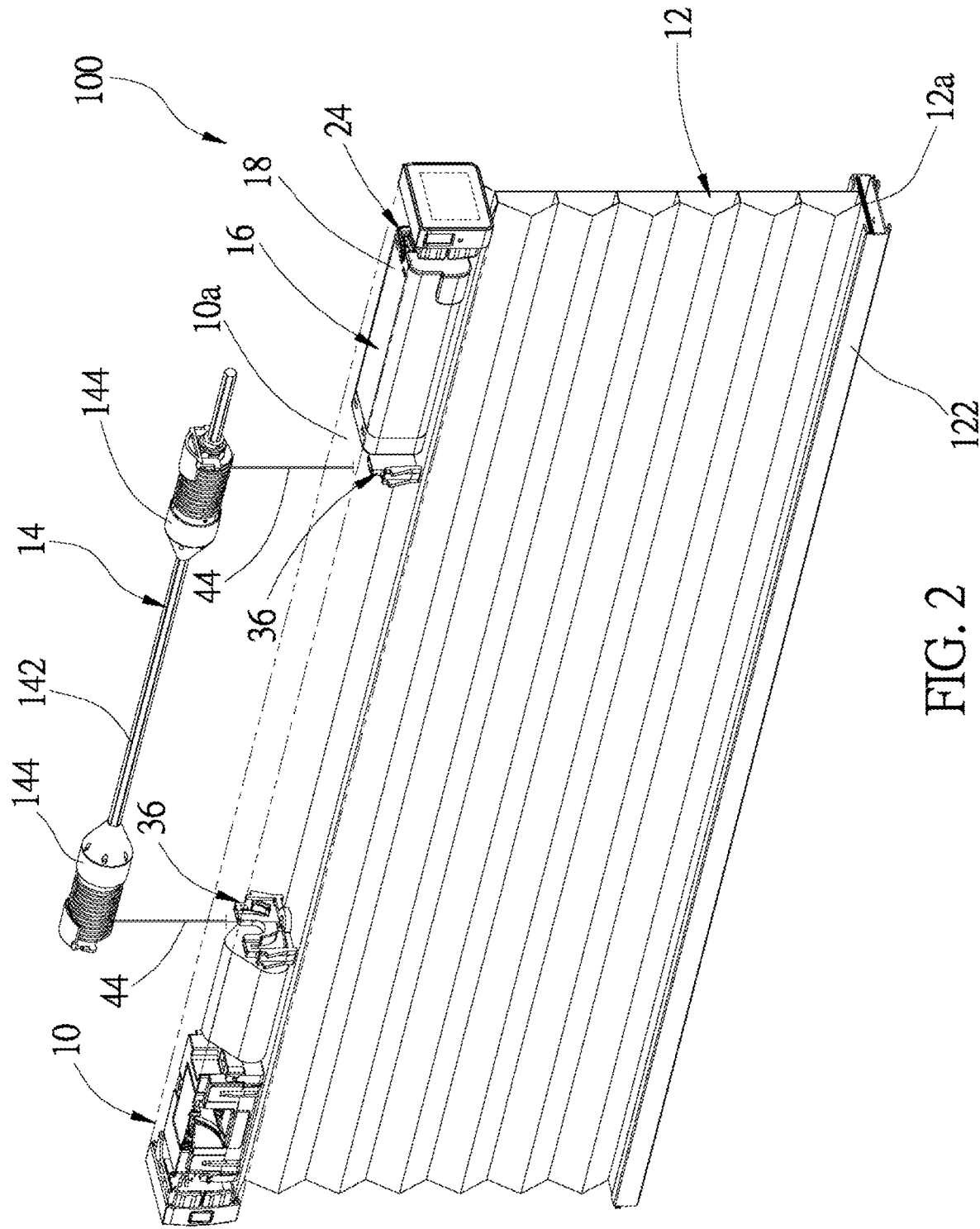
FIG. 2 is a partial exploded perspective view of the window covering of the first embodiment.

A window covering 100 of a first embodiment of the present disclosure is shown in FIG. 1 to FIG. 10 which includes a headrail 10, a covering material 12, a rotating member 14, a driving device 16, and a control device 24.

The headrail 10 is a frame having a receiving space 10*a* therein. The covering material 12 is located below the headrail 10, and the covering material 12 has a lower end 12*a* away from the headrail 10.

The rotating member 14 is provided in the receiving space 10*a* of the headrail 10, and includes a spindle 142 and two spools 144. The spindle 142 extends in a longitudinal direction of the headrail 10. The spools 144 fixedly fit around the spindle 142, and are apart from each other by a certain distance. Each of the spools 144 has a cord 44 wound therearound, wherein an end of each of the cords 44 is fixed at the corresponding one of the spools 144.

Each of the cords 44 passes through a cord hole 102 located on a bottom of the headrail 10, and goes through the covering material 12 in a vertical direction, with another end thereof reaching the lower end 12*a* of the covering material 12. The lower end 12*a* of the covering material 12 includes a bottom rail 122, wherein the another ends of the cords 44 are connected to the bottom rail 122. In some embodiments, the number of the spools 144 and the cords 44 are not limited to two as exemplified above, but could be only one or more than two.

The driving device 16 is provided in the receiving space 10*a* of the headrail 10, and includes a casing 18, a motor 20, and a decelerator 22, wherein the motor 20 and the decelerator 22 are located in the casing 18. The motor 20 is coupled to the spindle 142 through the decelerator 22, wherein a shaft 202 of the motor 20 is connected to the decelerator 22, and the decelerator 22 is connected to an end of the spindle 142. In an embodiment, the decelerator 22 is a planetary gearing decelerator; however, this is not a limitation of the present disclosure. The motor 20 drives the spindle 142 to rotate, and the spools 144 fixedly fitting around the spindle 142 would be concurrently driven to rotate as well, whereby the spools 144 could release out or reel in the cords 44 to drive the covering material 12 to expand (close) or collapse (open). A length of a segment of each of the cords 44 which can be fully released out from the corresponding spool 144 due to the driving of the motor 20 is slightly longer than a length of the covering material 12 when it is fully expanded or lowered. Understandably, in any embodiments described or implied in the present disclosure, the so mentioned length of the segment of each of the cords 44 released out from the corresponding spool 144 refers to the segment length that each cord 44 gets released out from the respective spool 144 by the driving of the motor 20, not a distance between each of the spools 144 and the lower end 12*a* of the covering material 12.

The control device 24 is provided in the receiving space 10*a* of the headrail 10, and is electrically connected to the motor 20, wherein the control device 24 is adapted to control the motor 20 to rotate, whereby to drive the covering material 12 to expand or collapse. Furthermore, the control device 24 would control the motor 20 to stop operating when a moving speed of the lower end 12*a* of the covering material 12 decreases and such a situation lasts for a predetermined time. In this way, when the covering material 12 is expanded to eventually reach a fully expanded (i.e., fully lowered) position, is collapsed to eventually reach a fully collapsed (i.e., fully raised) position, or encounters resistance during its expanding or collapsing, the control device 24 could stop the covering material 12 from moving because the moving speed of the lower end 12*a* of the covering material 12 decreases for at least the predetermined time or even longer. Whereby, the covering material 12 could stay in a fully expanded state or a fully collapsed state. In addition, the covering material 12 would not exert further force on the blocking object that it bumps into during the expanding or collapsing process, and the window covering 100 could be prevented from being damaged as well.

In an embodiment, the control device 24 includes a control module 26 and a detecting module 30, wherein the control module 26 controls the motor 20 through a driving circuit 28 to drive the spindle 142 of the rotating member 14 to rotate in a first rotating direction D1 or a second rotating direction D2. When the spindle 142 of the rotating member 14 rotates in the first rotating direction D1, the spools 144 which fixedly fit around the spindle 142 would be driven by the spindle 142 to rotate as well, whereby to reel in the cords 44 and therefore to collapse or retract the covering material 12; when the spindle 142 of the rotating member 14 rotates in the second rotating direction D2, the spools 144 which fixedly fit around the spindle 142 would be driven by the spindle 142 to release out the cords 44, whereby to expand or lower the covering material 12.

The detecting module 30 is electrically connected to the control module 26, and is adapted to detect a rotating speed of the rotating member 14 or of the shaft 202 of the motor 20. While the covering material 12 is being collapsed (i.e., being raised), the control module 26 could, based on the detected rotating speed, determine whether the moving speed of the lower end 12*a* of the covering material 12 is lower than the moving speed moments ago, and whether such a situation lasts for the predetermined time. This way the control module 26 could learn if the covering material 12 has reached the fully collapsed position or if it encounters a blocking object during the process of collapsing. The detecting module 30 could further detect if any of the cords 44 has shifted away from a predetermined position P0, and the result of such detection could be used as an indication. Specifically speaking, if it is detected that at least one of the cords 44 has completely shifted away from the predetermined position P0, the control module 26 would realize that the moving speed of the lower end 12*a* of the covering material 12 has become lower than the moving speed moments ago, and such a situation has lasted at least for the predetermined time. Therefore, the control module 26 could use said indication to determine if the covering material 12 has reached the fully expanded position or if it encounters resistance from a blocking object during the process of expanding or lowering. The control module 26 would control the motor 20 to stop operating if it determines that the covering material 12 is in any of the following circumstances: the covering material 12 has been completely collapsed or raised to reach the fully collapsed position, has been completely expanded or lowered to the fully expanded position, or encounters resistance during the expanding or collapsing process. In an embodiment, the control module 26 could further include a microcontroller to make all kinds of judgments mentioned above. It has to be clarified that the predetermined time mentioned in some embodiments could be defined in the control device 24 as required. However, it should be a sufficient period of time so that the control device 24 could recognize the situation when the moving speed of the lower end 12*a* of the covering material 12 decreases or even becomes 0.

In the following paragraphs, we are going to explain the mechanism of how to determine if the covering material 12 has been fully collapsed (in other words, fully opened) or if it encounters resistance during the process of collapsing.

Figure 3:
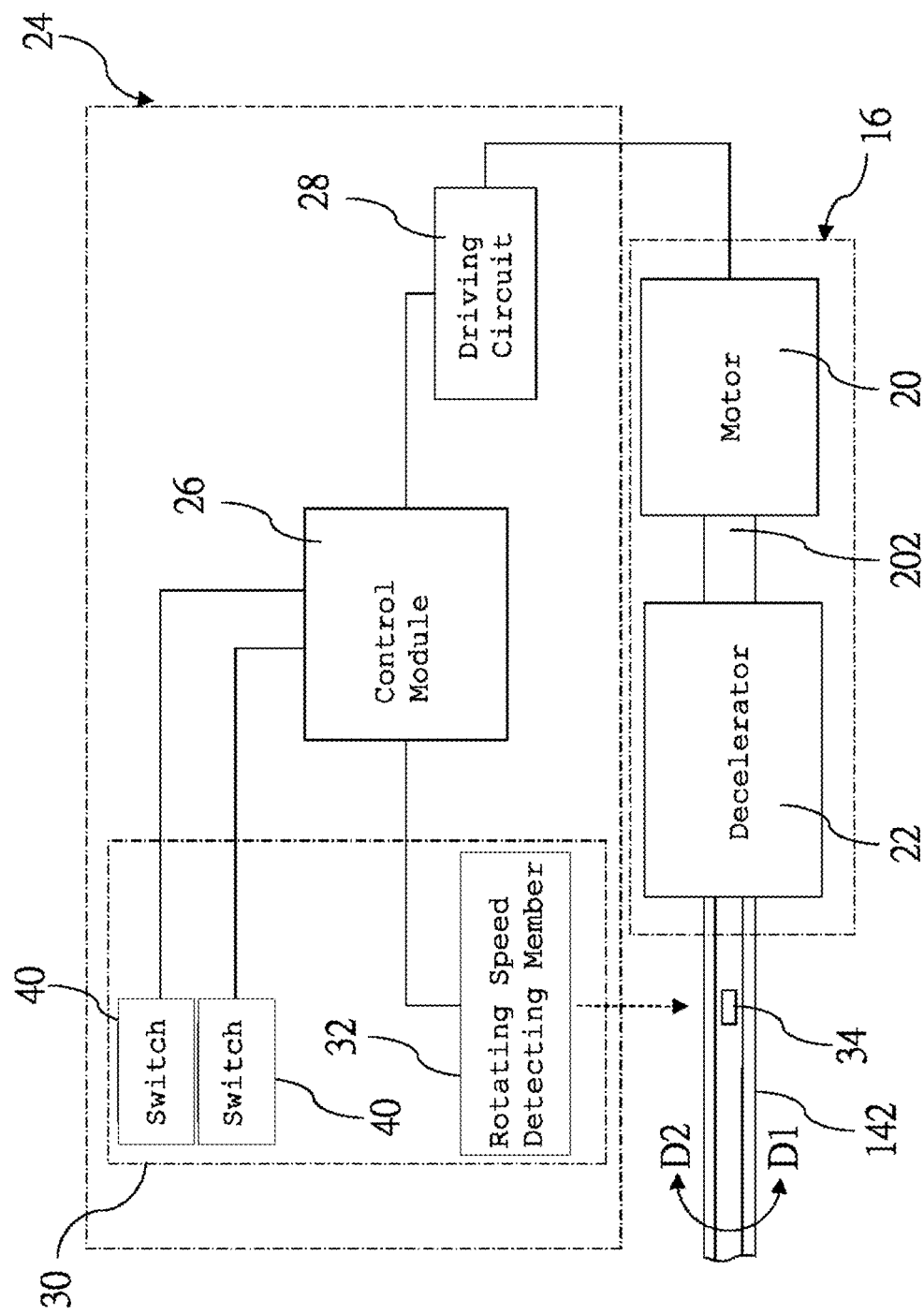
FIG. 3 is a schematic view showing the connection relation of the control device of the first embodiment.

The detecting module 30 includes a rotating speed detecting member 32, which is adapted to measure the rotating speed of the rotating member 14. In an embodiment, the rotating speed detecting member 32 is a Hall sensor, and a magnet 34 is provided on the rotating member 14 as shown in FIG. 3, wherein the magnet 34 is provided on the spindle 142. When the spindle 142 rotates, the rotating speed of the spindle 142 could be measured through the calculation of the changing on the magnetic field induction between the magnet 34 and the rotating speed detecting member 32.

Figure 4:
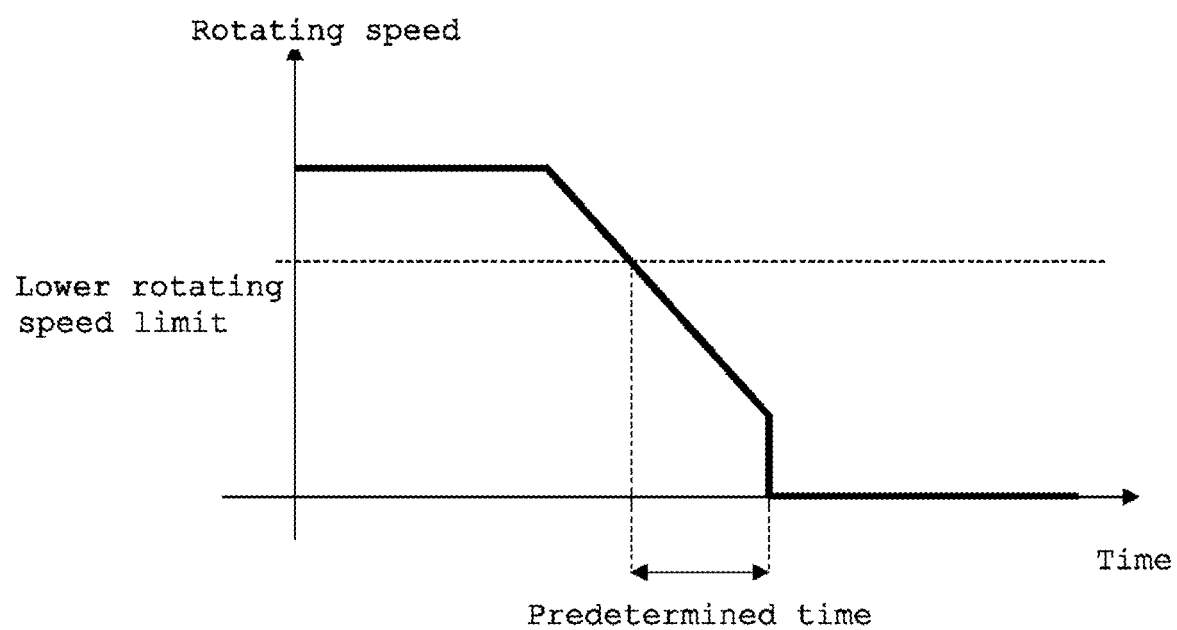
FIG. 4 is a chart showing the relation between the rotating speed of the rotating member of the first embodiment and time.

A lower rotating speed limit for the rotating member 14 could be set in advance in the control module 26, as shown in FIG. 4. When the control module 26 controls the motor 20 to drive the rotating member 14 to rotate in the first rotating direction D1 (i.e., when the covering material 12 is being collapsed or retracted), the control module 26 would receive a signal of the rotating speed measured by the rotating speed detecting member 32. The rotation of the rotating member 14 would be hindered if the covering material 12 has been fully collapsed (retracted or raised) and any parts of the cords 44 which can be wound have already been wound around the spools 144, or if the covering material 12 encounters resistance during the process of collapsing and the resultant pulling and tugging cause the cords 44 unable to be further wound around the spools 144. As a result, the rotating speed of the rotating member 14 would decrease, and therefore the moving speed of the lower end 12*a* of the covering material 12 which is driven by the rotating member 14 would decrease as well. Once the rotating speed measured by the detecting module 30 is lower than the lower rotating speed limit, and such a situation lasts for the predetermined time, the control module 26 would control the motor 20 to stop rotating. Whereby, no matter the covering material 12 is fully collapsed, or bumps into a blocking object during the process of collapsing, the motor 20 would be stopped from operating. If the rotating speed measured by the detecting module 30 returns to a speed higher than the lower rotating speed limit within the predetermined time, the control module 26 would determine that the covering material 12 bumps into a blocking object only for a brief moment, and the moving speed of the lower end 12*a* of the covering material 12 would not be affected by the blocking object so the covering material 12 would be still able to collapse or retract normally. Therefore, the control module 26 could, through the driving circuit 28, control the motor 20 to keep operating. In an embodiment, the lower rotating speed limit is half of the rotating speed of the motor, and the predetermined time period is 100 ms to 200 ms.

In an embodiment, the magnet 34 could be provided on the spool 144 or the shaft 202 of the motor 20 instead. However, since a rotating speed of the shaft 202 of the motor 20 is higher than the rotating speed of the rotating member 14, in an embodiment that the magnet 34 is provided on the shaft 202 of the motor 20, the lower rotating speed limit should be adjusted to match the rotating speed of the shaft 202 of the motor 20. In other embodiments that the rotating speed detecting member 32 is provided on the shaft 202 of the motor 20, said rotating speed detecting member 32 could be an encoder, a resolver, or any device capable of measuring the rotating speed of the shaft 202 of the motor 20.

In the above paragraphs, we have explained the mechanism of the current embodiment regarding how to determine if the covering material 12 has been fully collapsed, or if it encounters resistance from a blocking object during its process of collapsing. Then, in the following paragraphs, we are going to describe the mechanism of how to determine if the covering material 12 has been fully expanded, or if it encounters resistance from a blocking object during the process of expanding (i.e., while on its way toward the fully expanded position).

Figure 5:
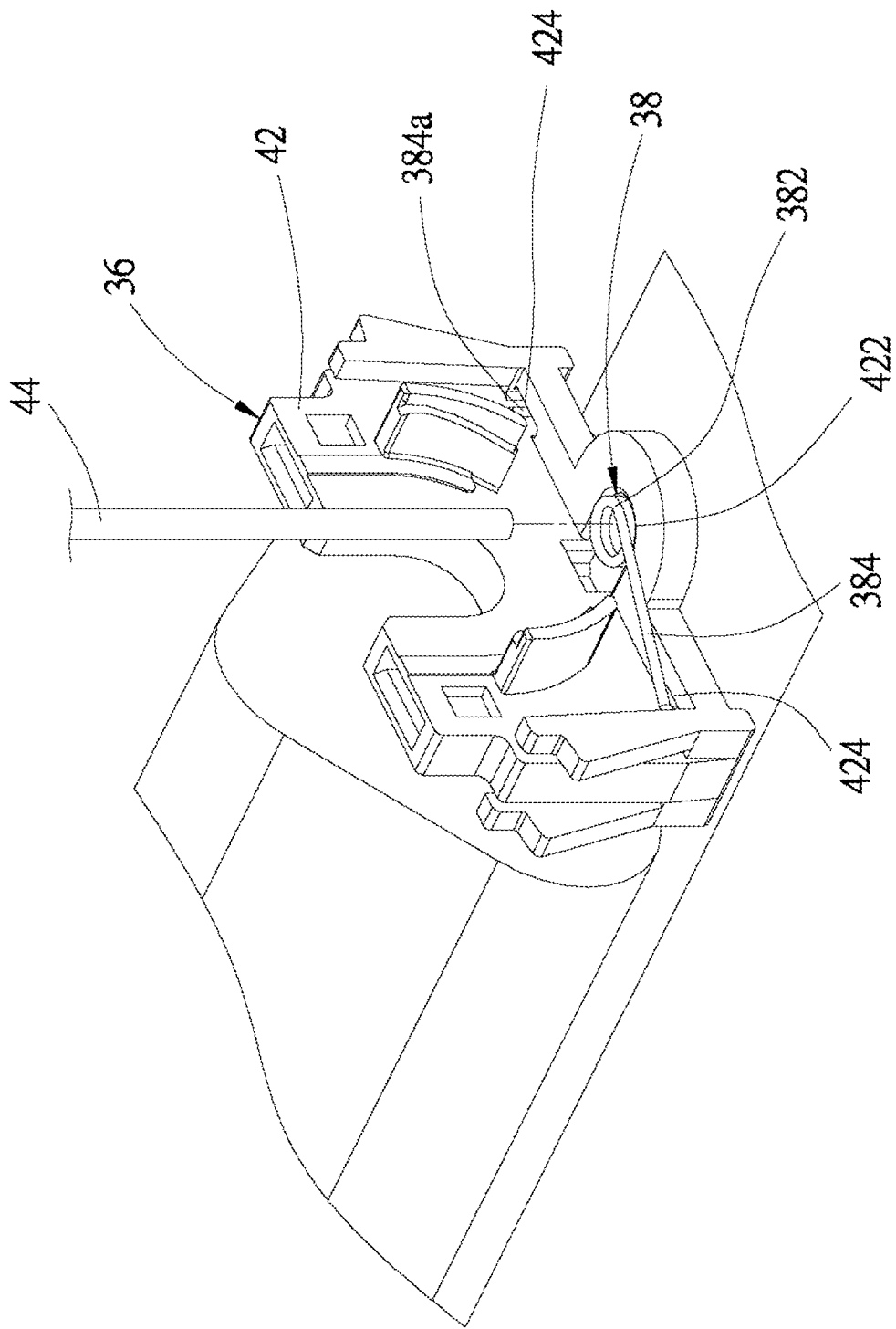
FIG. 5 is a perspective view of the detecting assembly located on the left side of the first embodiment.
Figure 6:
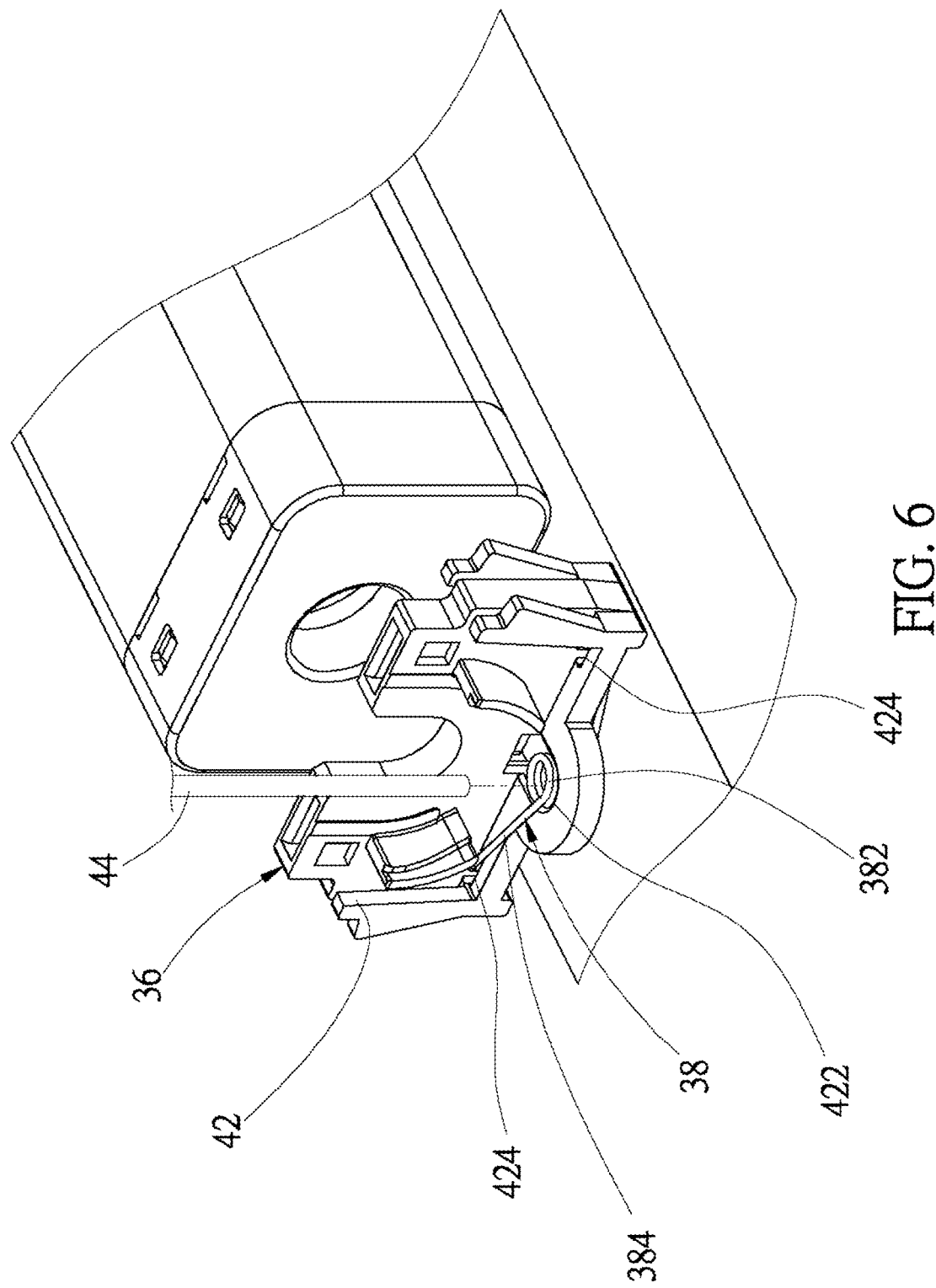
FIG. 6 is a perspective view of the detecting assembly located on the right side of the first embodiment.
Figure 7:
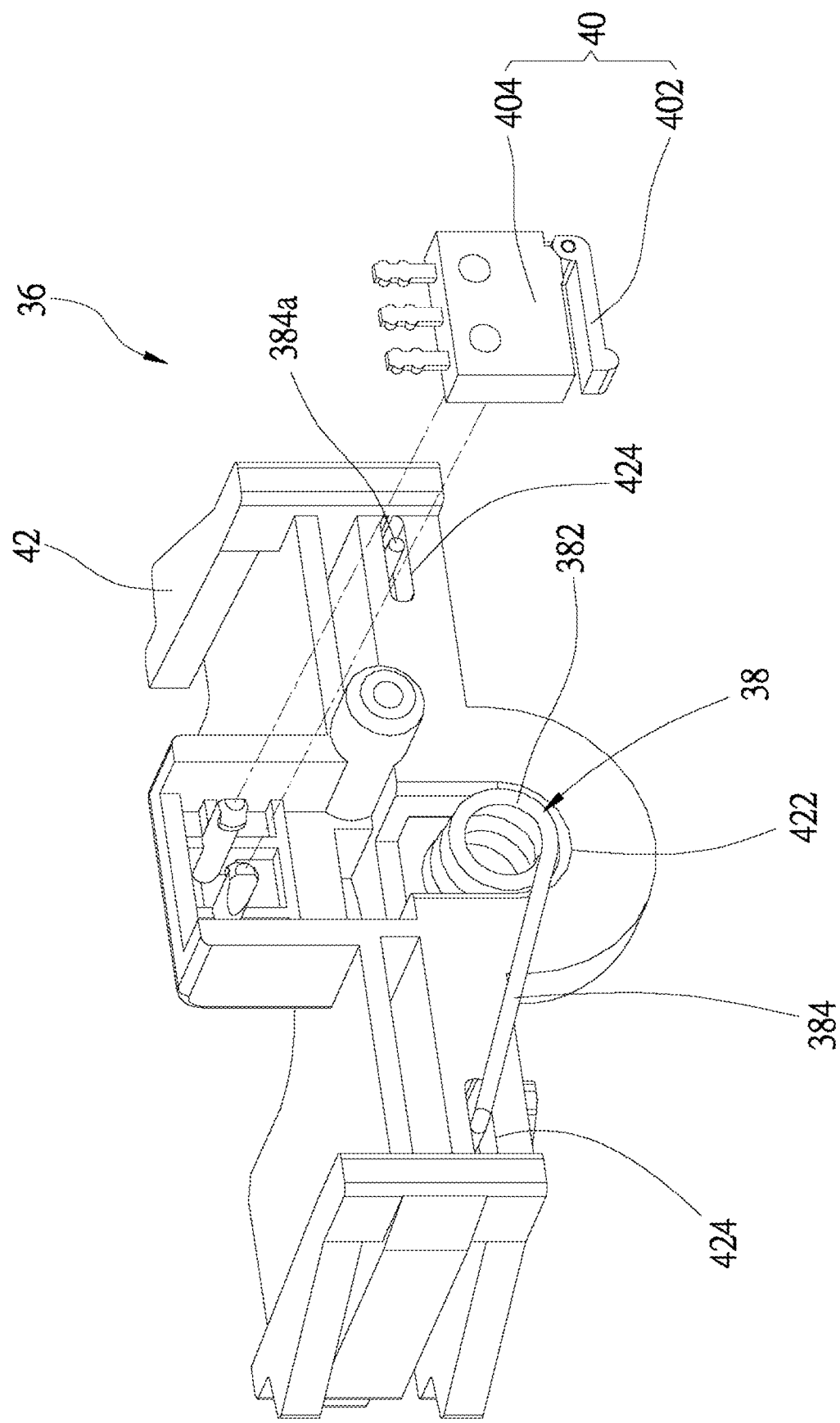
FIG. 7 is an exploded perspective view of the detecting assembly located on the left side of the first embodiment.

As shown in FIG. 1 to FIG. 3, and FIG. 6 to FIG. 9, the detecting module 30 further includes two sets of detecting assemblies 36 provided in a symmetric manner, each of which is respectively located near one of the spools 144 (as shown in FIG. 5 and FIG. 6). Each of the detecting assemblies 36 has the same structure, and we take the detecting assemblies 36 illustrated on the left side of FIG. 5 as an example for explanation hereinafter.

This detecting assembly 36 includes an elastic member, which is a torsion spring 38 as an example, and a switch 40. The torsion spring 38 includes a winding portion 382 and two extending arms 384 connected to the winding portion 382. An end of each of the extending arms 384 has a bent section 384*a*. The winding portion 382 is located above the cord hole 102 on the left side of the headrail 10, and the cord 44 on this side passes through both the winding portion 382 and the cord hole 102. The winding portion 382 forms a restricting ring which confines the cord 44 in there. The switch 40 has an operation rod 402 and a main body 404, wherein the switch 40 is electrically connected to the control module 26. When the winding portion 382 of the torsion spring 38 is located at an original position (i.e., when it has no external force exerted thereon), it pushes against the operation rod 402 so that the operation rod 402 is forced to contact the main body 404 of the switch 40.

In an embodiment, each of the detecting assemblies 36 further includes a fixing seat 42 which is fixed at the headrail 10, and the torsion spring 38 and the switch 40 are provided on the fixing seat 42. The fixing seat 42 has a receiving hole 422 and two slots 424, wherein the receiving hole 422 is located above the cord hole 102. In a short axial direction of the headrail 10, the receiving hole 422 is located between the two slots 424. A longitudinal direction of each of the slots 424 is parallel to the short axial direction of the headrail 10. The winding portion 382 is located in the receiving hole 422, with the bent section 384*a* of each of the extending arms 384 going into one of the slots 424. By pulling the winding portion 382 to move in the longitudinal direction of the headrail 10, each of the bent sections 384*a* could be moved in the longitudinal direction of the respective slot 424.

Figure 8:
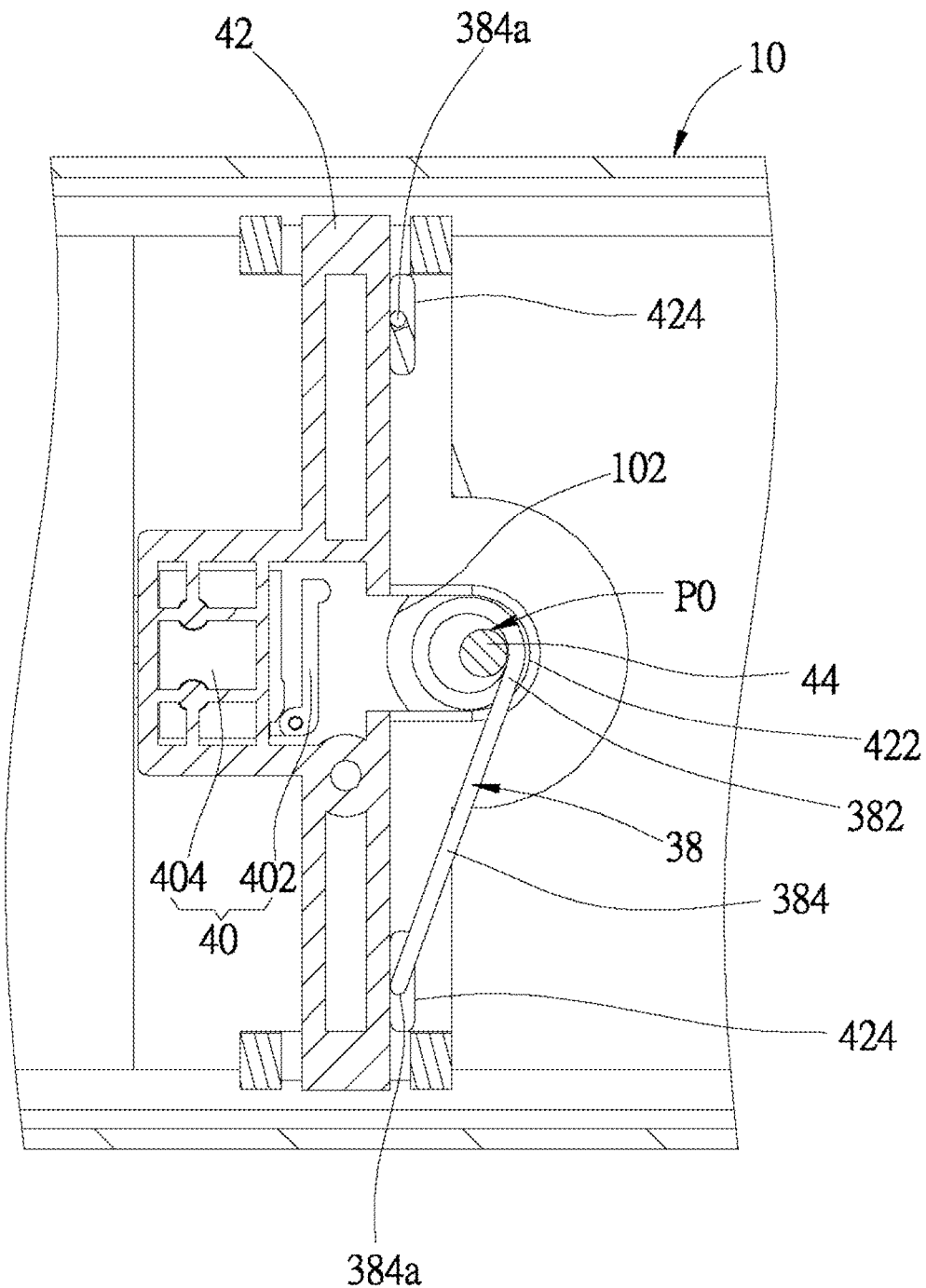
FIG. 8 is a schematic view showing the cord is located at a predetermined position.

As shown in FIG. 8, during the process of extending the covering material 12, an expanded length of the covering material 12 equals the length of the segment of each of the cords 44 released due to the driving of the motor 20, which means the cords 44 would be taut. At this time, each of the cords 44 is located at the predetermined position P0 in the respective cord hole 102, and exerts a force on the respective winding portion 382 in a direction away from the respective operation rod 402, so that the torsion spring 38 would be forced to leave the original position, accumulating an elasticity. Meanwhile, the main body 404 of the switch 40 is not touched by the operation rod 402, and the control module 26 could control the motor 20 through the driving circuit 28, whereby the rotating member 14 could be rotated in the first rotating direction D1 or the second rotating direction D2, driving the covering material 12 to open or close.

Figure 9:
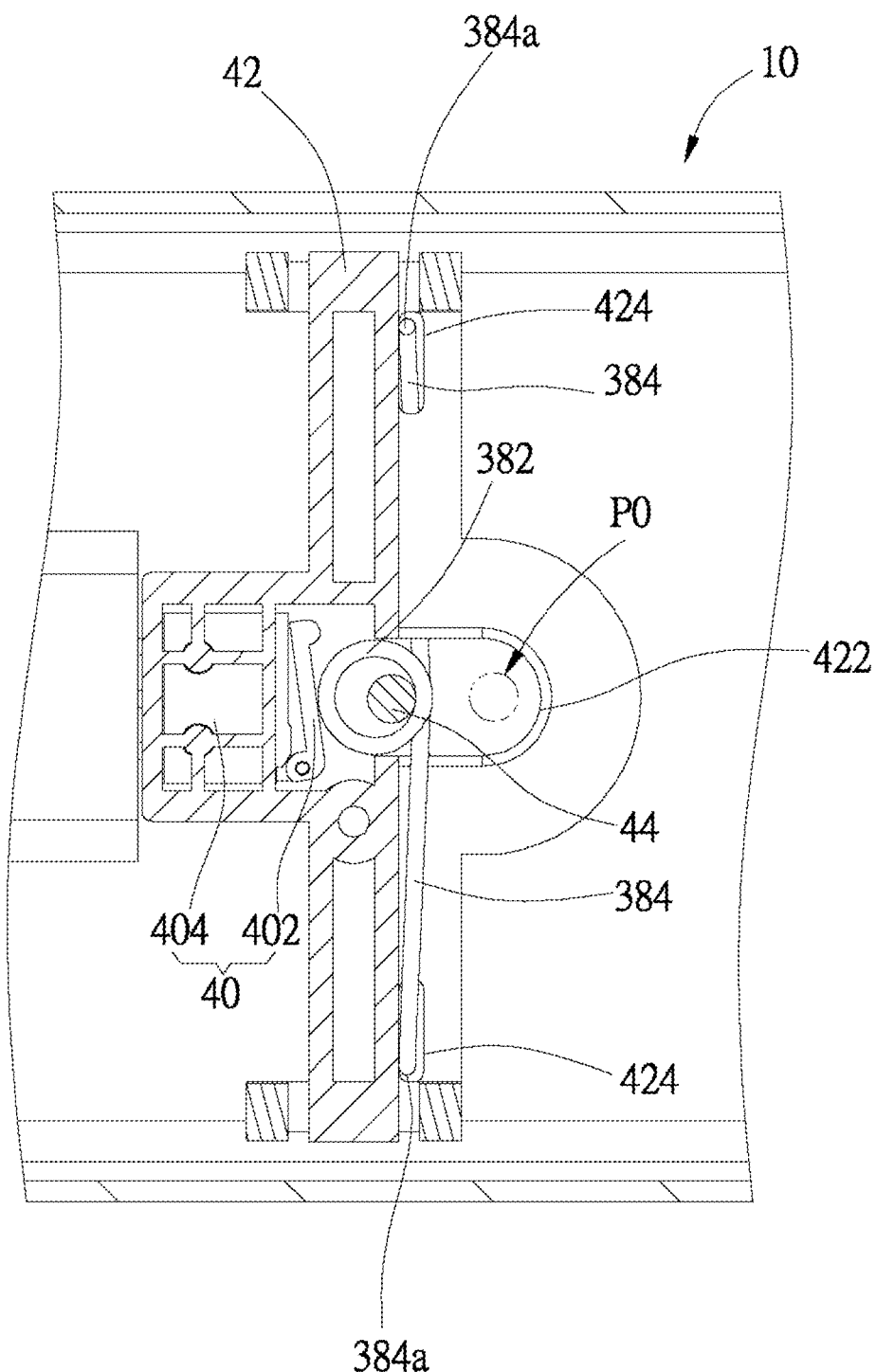
FIG. 9 is a schematic view showing the winding portion of the torsion spring presses the switch.

As shown in FIG. 9, when the covering material 12 is fully expanded and the moving speed of the lower end 12*a* of the covering material 12 has been decreased to zero, the length of the segment of each of the cords 44 fully released from the respective spool 144 due to the driving of the motor 20 would be slightly longer than the fully expanded length of the covering material 12. As a result, the motor 20 would still drive the cords 44 to be released from the spools 144 at least for the predetermined time (at this time, the moving speed of the lower end 12*a* of the covering material 12 is zero, and this situation lasts for the predetermined time). When the cords 44 are fully released by the driving of the motor 20, the tension of the cords 44 is no longer stretched by the length of the covering material 12, and therefore would be slack. As a result, the cords 44 would be no longer able to exert force on the winding portions 382, and therefore each of the torsion springs 38 would return to its original position through the accumulated elasticity, driving the corresponding cord 44 to shift and leave its predetermined position P0. Once the torsion springs 38 go back to the original position, the winding portion 382 of each of the torsion springs 38 would press against the corresponding operation rod 402, whereby to trigger the switches 40, making the switches 40 switch from a first state into a second state, e.g., from an open circuit state to a short circuit state. After the switches 40 are touched and therefore serve as a trigger, the control module 26 would, as responsive to the trigger, control the motor 20 to stop operating. In this way, when the covering material 12 is fully expanded, the motor could stop automatically. When the control module 26 controls the rotation of the motor 20 in a direction of retrieving the covering material 12, the control module 26 would ignore the current state of the switches 40 and reel up the cords 44. When the cords 44 are reeled up by the driving of the motor 20 to an extent that the released length of the cords 44 equals the expanded length of the covering material 12, the cords 44 would drive the lower end 12*a* of the covering material 12 to move in the direction of collapsing or ascending.

During the process of extending the covering material 12, if the covering material 12 bumps into a blocking object and the moving speed of the lower end 12*a* of the covering material 12 therefore decreases, the cords 44 would be still released out by the driving of the motor 20, and the moving speed of the lower end 12*a* of the covering material 12 would decrease (to even zero) for a predetermined time as the cords 44 being released. If the length of the segment of any one of the cords 44 released by the driving of the motor 20 is greater than the current expanded length of the covering material 12, said cord 44 would become loose (i.e., the force exerted by said cord 44 on the corresponding torsion spring 38 would be dismissed), and therefore the corresponding torsion spring 38 would return to its original position, which could drive said cord 44 to shift and leave the predetermined position P0. The torsion spring 38 that returns to its original position would make the winding portion 382 move toward and eventually press against the operation rod 402, whereby to trigger the switch 40. As a result, the switch 40 would be switched from a first state into a second state, e.g., from an open circuit state into a short circuit state. The control module 26 would control the motor 20 to stop operating if any of the switches 40 is triggered, whereby to stop the covering material 12 from expanding or lowering. In this way, the covering material 12 could stop expanding if it bumps into a blocking object during its expanding process, and therefore the covering material 12 or the blocking object could be prevented from being damaged.

After the covering material 12 stops moving upon encountering a blocking object during its expanding, if the control module 26 is going to control the motor 20 to rotate in a direction of collapsing or raising the covering material 12, the control module 26 would ignore the current state of the switches 40, and start to reel in the cords 44. When the length of the segment of each of the cords 44 released by the driving of the motor 20 equals the expanded length of the covering material 12, the cords 44 would drive the lower end 12*a* of the covering material 12 to move in the collapsing direction.

Figure 10:
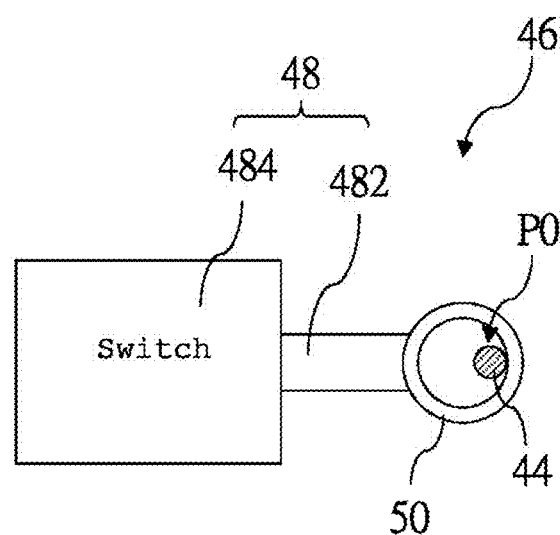
FIG. 10 is a schematic view showing the detecting assembly of a second embodiment of the present disclosure.
Figure 11:
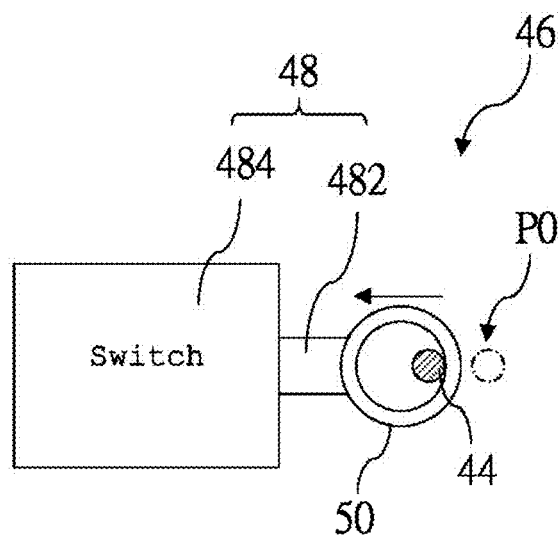
FIG. 11 is a schematic view, showing the operation rod of the switch retreats into the main body.

A detecting assembly 46 of a second embodiment of the present disclosure is shown in FIG. 10 and FIG. 11, which can be also applied to the window covering 100 of the first embodiment. The detecting assembly 46 of the current embodiment includes a switch 48 and a restricting ring 50, wherein the switch 48 has an operation rod 482 and a main body 484. The restricting ring 50 is connected to the operation rod 482, and, on each side, one of the cords 44 passes through the restricting ring 50. When the cord 44 on any given side is taut, said cord 44 is located at the predetermined position P0, and exerts a force to the restricting ring 50 in a direction away from the switch 48. The restricting ring 50 would pull the operation rod 482, forcing the switch 48 to be in a first state (e.g., open circuit). If the lower end 12*a* of covering material 12 reaches a fully expanded position or bumps into an obstruction, and such a situation lasts for a period of time, the cords 44 would become loose since the lengths of the segments of the cords 44 released by the driving of the motor 20 are greater than the expanded length of the covering material 12. Meanwhile, the force exerted by the cords 44 on the corresponding restricting rings 50 would be dismissed. At this time, an elastic member (not shown) inside the main body 484 of the switch 48 would drive the operation rod 482 to move in an opposite direction, whereby the switch 48 would be in a second state (e.g., short circuit). Furthermore, the restricting ring 50 could pull the cord 44 on the same side to shift and leave the predetermined position P0. The control module 26 would control the motor 20 to stop operating when the switch 40 is in the second state. Whereby, the motor 20 could be stopped from operating when the covering material 12 is fully expanded or when the covering material 12 bumps into an obstruction during the process of expanding.

As mentioned above, through the control device, the window covering provided in the present disclosure could control its motor to stop operating when the moving speed of the lower end of the covering material decreases for a predetermined time. In this way, the motor could be turned off to stop the covering material from further moving in each of the following situations: when the covering material is expanded to the fully expanded position; when the covering material is collapsed to the fully collapsed position; or when the covering material encounters resistance during the process of expanding or collapsing (i.e., while on its way toward the highest or lowest possible positions). With such a design, the process and components required for setting up the upper and lower limits could be reduced or even omitted. Furthermore, if the covering material bumps into a blocking object during its movement, it could be prevented from further colliding with the blocking object or getting damaged. In addition, in each of the above-mentioned embodiments, the number of the detecting assemblies of the detecting module is two; however, this is for the purpose of explanation, and in practice, the number of the detecting assemblies could be at least one as well.

Moreover, the control device 24 may be realized according to various design considerations. In another embodiment, when the lower end 12a of the covering material 12 moves and encounters resistance, instead of simply stopping the driving device 16, the control device 24 may further configure the driving device 16 to rotate reversely. For example, if the driving device 16 originally rotates in the second rotating direction D2 and the control device 24 configures the driving device 16 to rotate reversely, the control device 24 configures the driving device 16 to stop and then rotate in the first rotating direction D1. In the process of configuring the driving device 16 to rotate reversely, the control device 24 may explicitly configure the driving device 16 to rotate in a first rotating direction, stop for a human noticeable duration, and then rotate in a second rotating direction. In another embodiment, the control device 24 may also configure the driving device 16 to operate as if the driving device 16 changes the rotating direction without a halt. There is, however, at least a small amount of time, even if human-unnoticeable, in which the rotating speed of the driving device 16 approaches zero and behaves like being stopped. Whether the duration of time that the driving device 16 remains stopped is noticeable by human or not, when referring to the process of rotating the driving device 16 reversely, the driving device 16 is considered to stop from rotating in the previous rotating direction and then rotate in the other direction. Accordingly, the lower end 12a of the covering material 12 is considered to stop from a previous moving direction and then move in the other direction.

When the lower end 12a of the covering material 12 moves downward and encounters resistance, the cords 44 may become loose and tangled, and therefore fail to function properly anymore. In another embodiment, when the lower end 12a of the covering material 12 moves downward and encounters resistance, instead of simply stopping the driving device 16, the control device 24 configures the driving device 16 to rotate reversely. Thus, a suitable length of the cords 44 may be reeled in to the spools 144, and the cords 44 may remain taut as a result. The tangle of the cords 44 and the consequent malfunction can be prevented. The reeled-in length of the cords 44 may be configured to be a predetermined length, a length determined by rotating the driving device 16 for a predetermined time, or dynamically determined by the control device 24. For example, in the process of rotating the driving device 16 reversely, once the state of the switch 40 changes, indicating that the cords 44 are taut, the control module 26 accordingly configures the driving device 16 to stop rotating reversely.

Moreover, the control device 24 may also calculate the position of the lower end 12a of the covering material 12 according to the output of the rotating speed detecting member 32. For example, the rotating speed detecting member 32 detects the rotating direction and the rotating speed of the rotating member 14 and/or the driving device 16 according to information such as the rotating speed(s) of the spindle 142, the spool 144 and/or the output shaft 202 of the motor 20. The control device 24 would be able to calculate the length of the cords 44 released from the headrail 10 based on the rotating direction, the rotating speed, and the rotating time of the rotating member 14 and/or the driving device 16 according to the output(s) of the rotating speed detecting member 32 and/or other component(s) (e.g., an encoder, a resolver, a timer circuit and a memory unit). In addition to the released length of the cords 44, the control device 24 also has the knowledge of the positions of the upper limit and the lower limit of the covering material 12, and therefore can calculate the position of the lower end 12a of the covering material 12.

In another embodiment, when the lower end 12a of the covering material 12 encounters resistance, the position of the lower end 12a of the covering material 12 may incur different problems which require different solutions. The control device 24 may further configure the driving device 16 to rotate reversely for moving the lower end 12a of the covering material 12 for different distances in response to various scenarios. For example, the lower limit of the lower end 12a of the covering material 12 may be configured by a lowermost position of the lower end 12a of the covering material 12 when it touches or approaches a reference surface position. The reference surface position may be the positions of a sill, a floor, a ground, or other suitable horizontal levels (may be a tilt and/or uneven surface as well). The lower end 12a of the covering material 12 may encounter resistance in the vicinity of the reference surface position due to inaccurate installment, aging of the cords 44 and/or the spool 144, small objects near the reference surface position (e.g., shoes, books and toys), etc. Even if the lower end 12a of the covering material 12 encounters resistance in the vicinity of the reference surface position, the lower end 12a of the covering material 12 should still not move below the lower limit, and therefore, in such circumstances, the cords 44 cannot get loose too much. In this situation, the possibility of the cords 44 getting tangled is lower, so reeling in a smaller length of the cords 44 for moving the lower end 12a of the covering material 12 in the reverse direction for a smaller distance may suffice. Whereas, when the lower end 12a of the covering material 12 encounters resistance at a distance away from the reference surface position, there is more room for the cords 44 to loosen and the probability of tangling the cords 44 is higher. It may, therefore, be better to reel in a greater length of the cords 44 for moving the lower end 12a of the covering material 12 for a greater distance to prevent the tangle of the cords 44. In the above embodiment, the reference surface position corresponds to physical positions in the real world. In other embodiments, the reference surface position may be configured according to the upper limit of the covering material 12, the lower limit of the covering material 12, the position of the headrail 10, and/or the output of the rotating speed detecting member 32. The control device 24 may therefore configure the driving device 16 to rotate, stop and rotate reversely according to the reference surface position. For example, the control module 26 may configure the reference surface position to be the position where the lower end 12a of the covering material 12 will reach after the driving device 16 rotating for 15 seconds for releasing the lower end 12a of the covering material 12 from the position of the headrail 10. In another embodiment, the control device 24 may be configured to have multiple reference surface positions.

Moreover, since the covering material 12 may be elastic or stretchable to some degree, it might not be easy to precisely detect the distance when the control device 24 configures the lower end 12a of the covering material 12 to move. Therefore, in another embodiment, when the control device 24 configures the lower end 12a of the covering material 12 to move, the distance of the covering material 12 to be moved may be related to the length of the cords 44 to be reeled in by the driving device 16.

Figure 12:
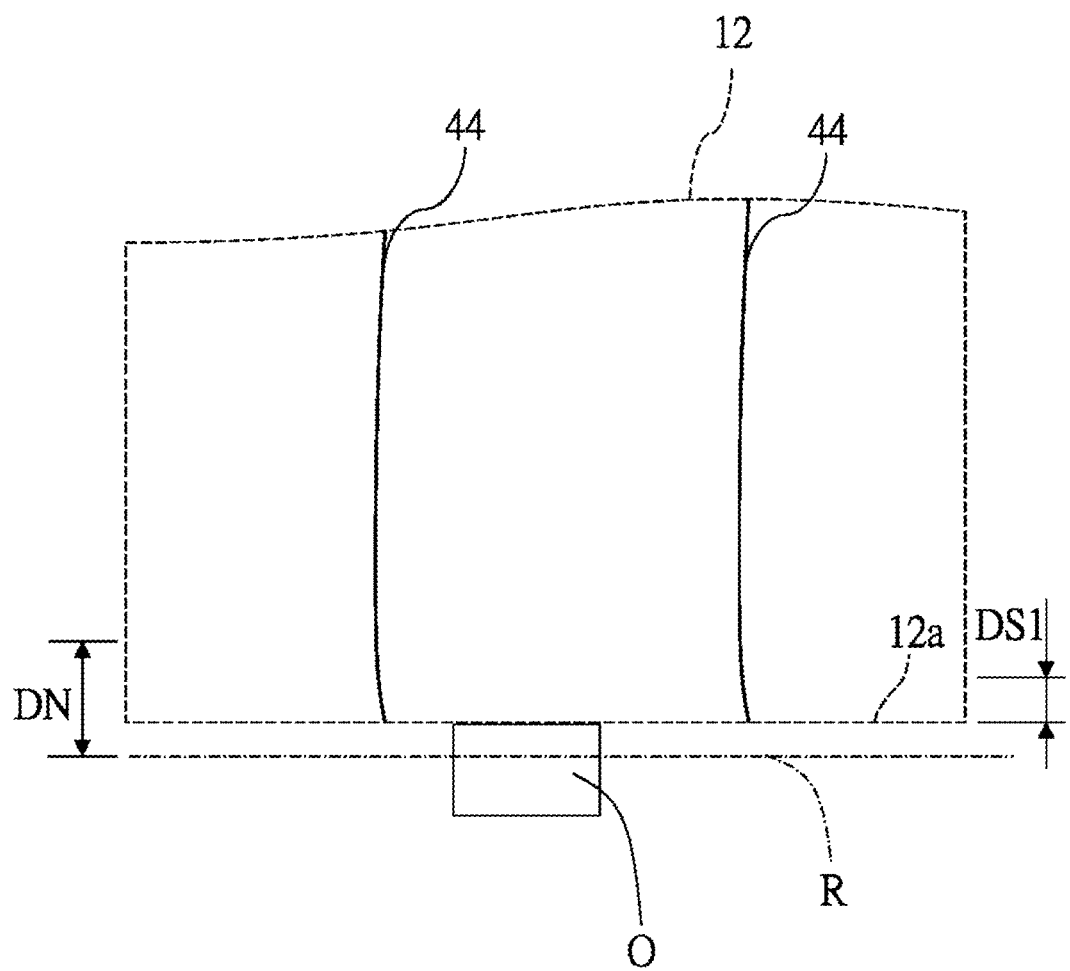
FIG. 12 is a schematic view, showing the situation when the lower end of the covering material encounters resistance at a location within the first predetermined distance.
Figure 13:
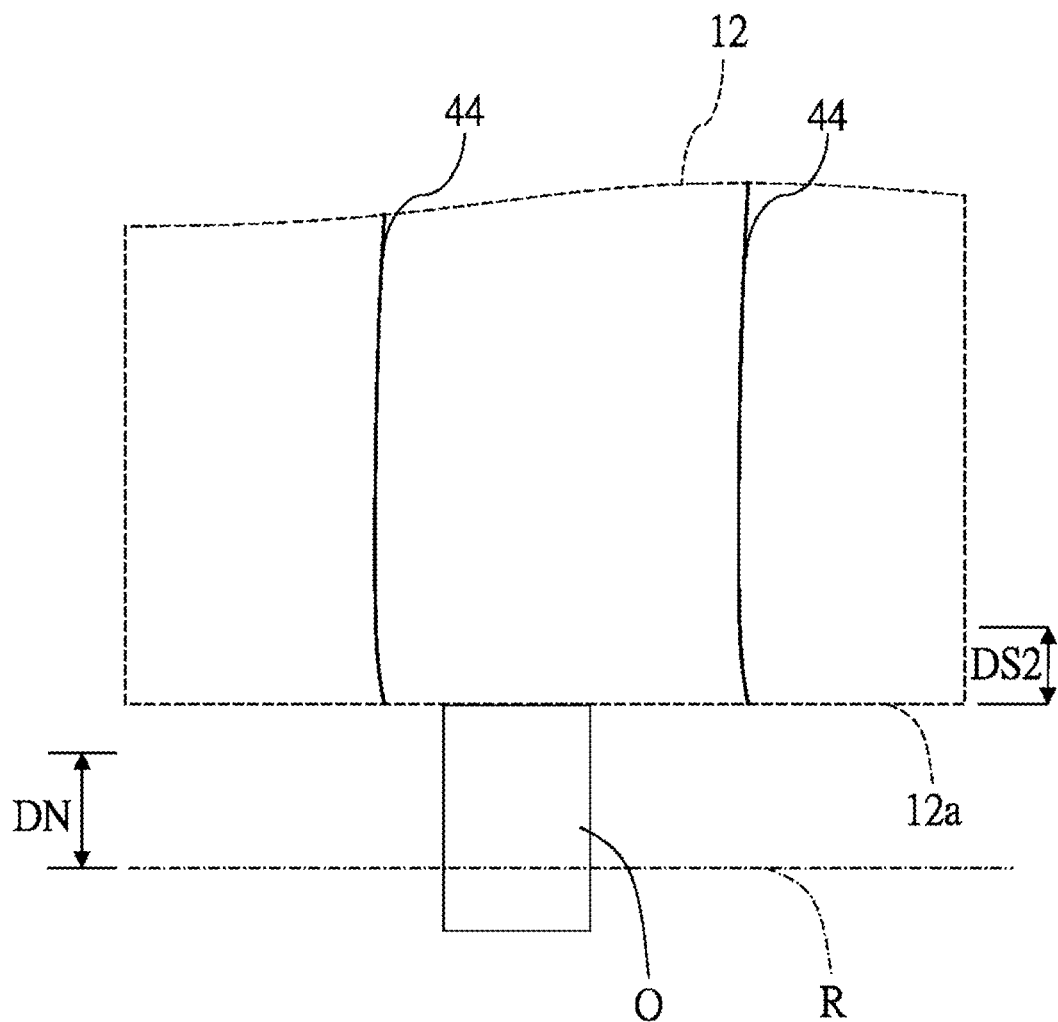
FIG. 13 is a schematic view, showing the situation when the lower end of the covering material encounters resistance at a location out of the first predetermined distance.

In another embodiment, as shown in FIG. 12, when the lower end 12a of the covering material 12 encounters resistance within a first predetermined distance DN measured from the reference surface position R, the control device 24 configures the driving device 16 to reel in the cords 44 for a first length L1 for moving the lower end 12a of the covering material 12 upward for a first distance DS1. On the other hand, as shown in FIG. 13, when the lower end 12a of the covering material 12 encounters resistance at a position out of the first predetermined distance DN measured from the reference surface position R, the control device 24 configures the driving device 16 to reel in the cords 44 for a second length L2 for moving the lower end 12a of the covering material 12 upward for a second distance DS2. In this embodiment, the first length L1 is configured to be smaller than the second length L2, so that the first distance DS1 is smaller than the second distance DS2. Moreover, the first length L1 may also be configured to be greater than or equal to the second length L2 for accommodating different scenarios. In another embodiment, the first length L1 is configured to be greater than the second length L2 for solving another problem. When the lower end 12a of the covering material 12 encounters resistance at a position out of the first predetermined distance measured from the reference surface position, the control device 24 configures the driving device 16 to reel in the cords 44 for the second length L2 for moving the lower end 12a of the covering material 12 upward for a shorter second distance DS2. In this embodiment, the reference surface position and the lengths L1 and L2 may be respectively configured to be different from the counterparts in the previous embodiment. The shorter second length L2 and the shorter second distance DS2 may prevent the lower end 12a of the covering material 12 from bumping into the headrail 10, whereby to avoid unnecessary reactions and/or damage of the components. For example, the power consumption may be lower for not executing unnecessary reactions which may take place when the lower end 12a of the covering material 12 bumps into the headrail 10. Moreover, the control device 24 may configure the driving device 16 to reel in the cords 44 for moving the lower end 12a of the covering material 12 upward for the same distance every time it encounters resistance, or, the control device 24 may also configure the driving device 16 to reel in the cords for moving the lower end 12a of the covering material 12 for a distance which is to be determined depending on the distance between the reference surface position and the position where the lower end 12a of the covering material 12 encounters resistance. For example, if the lower end 12a of the covering material 12 encounters resistance in the vicinity of the reference surface position and the headrail 10, the control device 24 configures the driving device 16 to reel in the cords 44 for moving the lower end 12a of the covering material 12 upward for a shorter distance. On the contrary, if the lower end 12a of the covering material 12 encounters resistance elsewhere, the control device 24 configures the driving device 16 to reel in the cords 44 for moving the lower end 12a of the covering material 12 upward for one or more greater distances.

Moreover, if the control device 24 configures the driving device 16 to move the lower end 12a of the covering material 12 upward for too much distance, a gap may be left or even widened in the vicinity of the reference surface position, allowing light to pass through, which usually bothers the users. In another embodiment, when the lower end 12a of the covering material 12 encounters resistance in the vicinity of the reference surface position, the control device 24 configures the driving device 16 to move the lower end 12a of the covering material 12 upward for a short distance and check whether the state of the switch 40 changes as the cords 44 become taut. The control device 24 iterates the operations of moving the lower end 12a of the covering material 12 upward for a short distance and checking the state of the switch 40 until the switch 40 changes its state to indicate that the cords 44 are taunt or until a predetermined number of iterations are performed. Therefore, the gap caused by moving the lower end 12a of the covering material 12 upward may be eliminated or narrowed.

Moreover, if the lower end 12a of the covering material 12 moves at a high speed when encounters resistance, the rotating speed of the rotating member is high and a large amount of the cords 44 may become loose. The possibility that the cords 44 get tangled and have malfunction may therefore be higher. In another embodiment, the control device 24 configures the driving device 16 to move the lower end 12a of the covering material 12 for different distances according to different rotating speed of the driving device 16 and/or the rotating member 14. When the rotating speed of the driving device 16 and/or the rotating member 14 is lower than a predetermined speed threshold, the control device 24 configures the driving device 16 to reel in the cords 44 for a third length L3 for moving the lower end 12a of the covering material 12 upward for a third distance DS3. When the rotating speed of the driving device 16 and/or the rotating member 14 is higher than the predetermined speed threshold, the control device 24 configures the driving device 16 to reel in the cords 44 for a fourth length L4 for moving the lower end 12a of the covering material 12 upward for a fourth distance DS4. In this embodiment, the third length L3 is configured to be smaller than the fourth length L4, so that the third distance DS3 is smaller than the fourth distance DS4. In another embodiment, the third length L3 may also be configured to be greater than or equal to the fourth length L4 for accommodating different scenarios. Moreover, the control device 24 may also configure the driving device 16 to reel in the cords 44 for moving the lower end 12a of the covering material 12 upward for a distance which is to be determined according to the rotating speed of the driving device 16 and/or the rotating member 14.

Moreover, the above embodiments may be properly combined to accommodate different scenarios. In another embodiment, when the lower end 12a of the covering material 12 encounters resistance within the first predetermined distance measured from the reference surface position, the control device 24 configures the driving device 16 to stop without rotating reversely. When the lower end 12a of the covering material 12 encounters resistance at a position out of the first predetermined distance measured from the reference surface position, the control device 24 configures the driving device 16 to reel in the cords 44 for moving the lower end 12a of the covering material 12 upward for an appropriate distance. In another embodiment, when the lower end 12a of the covering material 12 encounters resistance within the first predetermined distance measured from the reference surface position, the control device 24 configures the driving device 16 to reel in the cords 44 for a fifth length L5 for moving the lower end 12a of the covering material 12 upward for a shorter fifth distance DS5. When the lower end 12a of the covering material 12 encounters resistance at a position out of the first predetermined distance measured from the reference surface position, the control device 24 configures the driving device 16 to reel in the cords 44 respectively for a sixth length L6 and a seventh length L7 for moving the lower end 12*a* of the covering material 12 upward respectively for a sixth distance DS6 and a seventh distance DS7 according to the rotating speed of the driving device 16 and/or the rotating member 14. Moreover, the sixth length L6 and the seventh length L7 are different but both greater than the fifth length L5. In another embodiment, when the lower end 12*a* of the covering material 12 encounters resistance and the rotating speed of the driving device 16 and/or the rotating member 14 is higher than the predetermined speed threshold, the control device 24 configures the driving device 16 to move the lower end 12*a* of the covering material 12 upward. Whereas when the lower end 12*a* of the covering material 12 encounters resistance and the rotating speeds of the driving device 16 and/or the rotating member 14 is lower than the predetermined speed threshold, the control device 24 configures the driving device 16 to stop.

In the drawings, the motor 20 and the decelerator 22 of the driving device 16 are respectively drawn as a single element for the purposes of conciseness and clear explanation. In the above embodiments, the driving device 16 may also comprise more than one motor and/or more than one decelerator. For example, when the control device 24 configures the driving device 16 to drive the rotating member 14 in the first rotating direction D1, the motor 20 and a first decelerator (not shown in the figures) may be used to drive the rotating member 14 in the first rotating direction D1. Whereas, when the control device 24 configures the driving device 16 to drive the rotating member 14 in the second rotating direction D2, the motor 20 and a second decelerator (not shown in the figures) may be used to drive the rotating member 14 in the second rotating direction D2. In another embodiment, when the control device 24 configures the driving device 16 to drive the rotating member 14 in the first rotating direction D1, a first motor (not shown in the figures) and the decelerator 22 may be used to drive the rotating member 14 in the first rotating direction D1. Whereas, when the control device 24 configures the driving device 16 to drive the rotating member 14 in the second rotating direction D2, a second motor (not shown in the figures) and the decelerator 22 may be used to drive the rotating member 14 in the second rotating direction D2. In another embodiment, when the control device 24 configures the driving device 16 to drive the rotating member 14 in the first rotating direction D1, the first motor and the first decelerator may be used to drive the rotating member 14 in the first rotating direction D1. Whereas, when the control device 24 configures the driving device 16 to drive the rotating member 14 in the second rotating direction D2, the second motor and the second decelerator may be used to drive the rotating member 14 in the second rotating direction D2.

It must be pointed out again that the embodiments described above are only some embodiments of the present disclosure. All equivalent structures which employ the concepts disclosed in this specification and the appended claims should fall within the scope of the present disclosure.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A window covering, comprising:
a headrail which has a longitudinal direction;
a covering material provided below the headrail;
a rotating member provided in the headrail and connected to the covering material, wherein the rotating member is adapted to drive the covering material to be raised or lowered;
a driving device provided in the headrail and coupled to the rotating member, wherein the driving device drives the rotating member to rotate;
a control device provided in the headrail and electrically connected to the driving device, wherein, when a moving speed of a lower end of the covering material decreases and such a situation lasts for a predetermined time, the control device controls the driving device to stop operating; and
a cord;
wherein the control device comprises a detecting module and a control module which is electrically connected to the detecting module; the detecting module is adapted to detect the moving speed of the lower end of the covering material; the control module controls the driving device to stop operating when the moving speed of the lower end of the covering material decreases and such a situation lasts for the predetermined time;
wherein the rotating member comprises a spool; an end of the cord is fixed to the spool, and the cord is adapted to wind around the spool; another end of the cord is connected to the lower end of the covering material; a length of a segment of the cord fully released from the spool by a driving of the driving device is greater than a length of the covering material when fully expanded; wherein, when the length of the segment of the cord released by the driving of the driving device equals the length of the expanded covering material, the cord is located at a predetermined position in the longitudinal direction of the headrail; when the moving speed of the lower end of the covering material decreases and such a situation lasts for the predetermined time, the length of the segment of the cord released by the driving of the driving device is greater than the length of the expanded covering material, and the cord shifts and leaves the predetermined position in the longitudinal direction of the headrail; once the detecting module detects that the cord shifts and leaves the predetermined position, the control module controls the driving device to stop operating;
wherein the detecting module comprises a switch and a restricting ring, and the switch is electrically connected to the control module; the switch has an operation rod; the cord passes through the restricting ring, wherein the restricting ring is movably provided, and is adapted to conditionally touch the operation rod of the switch; when the cord is located at the predetermined position, the cord drives the restricting ring to leave the operation rod; when the cord shifts and leaves the predetermined position, the restricting ring moves toward and eventually presses against the operation rod, whereby to make the switch a trigger, so that the control module controls the driving device to stop operating.

2. The window covering of claim 1, wherein the detecting module comprises an elastic member which is concurrently movable along with the restricting ring; when the cord is located at the predetermined position, the cord exerts a force to the restricting ring in a direction away from the operation rod of the switch, wherein the elastic member is adapted to accumulate an elasticity; when the cord shifts and leaves the predetermined position, the elasticity of the elastic member drives the restricting ring to move toward and eventually press against the operation rod, whereby to make the switch a trigger, so that the control module controls the driving device to stop operating.

3. The window covering of claim 2, wherein the detecting module comprises a fixing seat which is fixed at the headrail, and the elastic member is provided at the fixing seat.

4. The window covering of claim 3, wherein the elastic member is a torsion spring which comprises a winding portion and two extending arms connected to the winding portion; the winding portion forms the restricting ring; the fixing seat has a receiving hole and two slots, wherein the winding portion is located in the receiving hole; each of the extending arms has a bent section at an end thereof, wherein the bent section of each of the extending arms goes into one of the slots, respectively; each of the bent sections is movable in a longitudinal direction of the corresponding slot.

5. The window covering of claim 3, wherein the switch is provided at the fixing seat.

6. The window covering of claim 4, wherein the headrail has a cord hole at a bottom thereof; the cord passes through the cord hole, and the receiving hole is located above the cord hole.

7. The window covering of claim 1, wherein, after stopping the driving device, the control device further configures the driving device to rotate in a second rotating direction different from a first rotating direction which the driving device previously rotates in, and configures the lower end of the covering material to move in a second moving direction different from a first moving direction which the lower end previously moves in.

8. The window covering of claim 7, wherein the control device configures the driving device to rotate in the second rotating direction for moving the lower end of the covering material for a predetermined distance in the second moving direction.

9. The window covering of claim 7, wherein:
the switch either in a first state representing the cord is taut or in a second state representing the cord is loose, wherein the control device configures the driving device to rotate in the second rotating direction for moving the lower end of the covering material in the second moving direction until the switch changes from the second state to the first state.

10. A window covering, comprising:
a headrail which has a longitudinal direction;
a covering material provided below the headrail;
a rotating member provided in the headrail and connected to the covering material, wherein the rotating member is adapted to drive the covering material to be raised or lowered;
a driving device provided in the headrail and coupled to the rotating member, wherein the driving device drives the rotating member to rotate;
a control device provided in the headrail and electrically connected to the driving device, wherein, when a moving speed of a lower end of the covering material decreases and such a situation lasts for a predetermined time, the control device controls the driving device to stop operating; and
a cord;
wherein the control device comprises a detecting module and a control module which is electrically connected to the detecting module; the detecting module is adapted to detect the moving speed of the lower end of the covering material; the control module controls the driving device to stop operating when the moving speed of the lower end of the covering material decreases and such a situation lasts for the predetermined time;
wherein the rotating member comprises a spool; an end of the cord is fixed to the spool, and the cord is adapted to wind around the spool; another end of the cord is connected to the lower end of the covering material; wherein, when the cord is taut, the cord is located at a predetermined position in the longitudinal direction of the headrail; when the moving speed of the lower end of the covering material decreases and such a situation last for the predetermined time, the cord is loose, and the cord shifts and leaves the predetermined position in the longitudinal direction of the headrail; once the detecting module detects that the cord shifts and leaves the predetermined position, the control module controls the driving device to stop operating;
wherein the detecting module comprises a switch and a restricting ring, and the switch is electrically connected to the control module; the switch has an operation rod; the cord passes through the restricting ring, wherein the restricting ring is movably provided, and is adapted to conditionally touch the operation rod of the switch; when the cord is located at the predetermined position, the cord drives the restricting ring to leave the operation rod; when the cord shifts and leaves the predetermined position, the restricting ring moves toward and eventually presses against the operation rod, whereby to make the switch a trigger, so that the control module controls the driving device to stop operating.

11. The window covering of claim 10, wherein the detecting module comprises an elastic member which is concurrently movable along with the restricting ring; when the cord is located at the predetermined position, the cord exerts a force to the restricting ring in a direction away from the operation rod of the switch, wherein the elastic member is adapted to accumulate an elasticity; when the cord shifts and leaves the predetermined position, the elasticity of the elastic member drives the restricting ring to move toward and eventually press against the operation rod, whereby to make the switch a trigger, so that the control module controls the driving device to stop operating.

12. The window covering of claim 11, wherein the detecting module comprises a fixing seat which is fixed at the headrail, and the elastic member is provided at the fixing seat.

13. The window covering of claim 12, wherein the elastic member is a torsion spring which comprises a winding portion and two extending arms connected to the winding portion; the winding portion forms the restricting ring; the fixing seat has a receiving hole and two slots, wherein the winding portion is located in the receiving hole; each of the extending arms has a bent section at an end thereof, wherein the bent section of each of the extending arms goes into one of the slots, respectively; each of the bent sections is movable in a longitudinal direction of the corresponding slot.

14. The window covering of claim 12, wherein the switch is provided at the fixing seat.

15. The window covering of claim 13, wherein the headrail has a cord hole at a bottom thereof; the cord passes through the cord hole, and the receiving hole is located above the cord hole.

16. The window covering of claim 10, wherein, after stopping the driving device, the control device further configures the driving device to rotate in a second rotating direction different from a first rotating direction which the driving device previously rotates in, and configures the lower end of the covering material to move in a second moving direction different from a first moving direction which the lower end previously moves in.

17. The window covering of claim 16, wherein the control device configures the driving device to rotate in the second rotating direction for moving the lower end of the covering material for a predetermined distance in the second moving direction.

18. The window covering of claim 16, wherein:
the switch either in a first state representing the cord is taut or in a second state representing the cord is loose,
wherein the control device configures the driving device to rotate in the second rotating direction for moving the lower end of the covering material in the second moving direction until the switch changes from the second state to the first state.

* * * * *